Fig. 3.

July 26, 1938.  S. BERGSTEIN  2,125,147

MACHINE AND METHOD FOR MAKING KNOCK-DOWN BOXES

Filed May 8, 1937  10 Sheets—Sheet 3

INVENTOR.
SAMUEL BERGSTEIN.
BY Allen & Allen
ATTORNEYS.

Fig. 10.

July 26, 1938.   S. BERGSTEIN   2,125,147
MACHINE AND METHOD FOR MAKING KNOCK-DOWN BOXES
Filed May 8, 1937   10 Sheets-Sheet 7

INVENTOR.
SAMUEL BERGSTEIN.
Allen & Allen
ATTORNEYS.

July 26, 1938. S. BERGSTEIN 2,125,147
MACHINE AND METHOD FOR MAKING KNOCK-DOWN BOXES
Filed May 8, 1937 10 Sheets-Sheet 8

INVENTOR.
SAMUEL BERGSTEIN.
BY Allen & Allen
ATTORNEYS.

July 26, 1938.  S. BERGSTEIN  2,125,147
MACHINE AND METHOD FOR MAKING KNOCK-DOWN BOXES
Filed May 8, 1937  10 Sheets-Sheet 9

INVENTOR.
SAMUEL BERGSTEIN.
BY Allen & Allen
ATTORNEYS.

July 26, 1938. S. BERGSTEIN 2,125,147
MACHINE AND METHOD FOR MAKING KNOCK-DOWN BOXES
Filed May 8, 1937 10 Sheets-Sheet 10

INVENTOR.
SAMUEL BERGSTEIN.
BY Allen & Allen
ATTORNEYS.

Patented July 26, 1938

2,125,147

UNITED STATES PATENT OFFICE 2,125,147

MACHINE AND METHOD FOR MAKING KNOCK-DOWN BOXES

Samuel Bergstein, Cincinnati, Ohio, assignor to Edna May Bergstein and Robert Morris Bergstein, as trustees Application May 8, 1937, Serial No. 141,497

19 Claims. (Cl. 93—49)

My invention relates to improvements in the manufacture of certain types of paper or paperboard boxes which can be manufactured and shipped in flat or knock-down form, and later erected at point of use. The particular type of box with which my invention is concerned is known commercially as an extension edge box, that is a box in which the edges of the main body panel extend beyond the side-walls of the box or beyond the inner area of the box. In my co-pending application, Serial Number 59,423, filed January 16, 1936, of which this application is a continuation in part, I have disclosed structures adaptable to this purpose, such boxes being formed from cut and creased blanks having a main body panel with side walls articulated to it through the medium of intermediate panels. The intermediate panels are secured to the corresponding portions of the edges of the main body panel, so that when the box is set up or erected it will have double-ply edges extending beyond the side walls, or beyond the inner area of the box.

In order to provide a box of this nature which can be set up or erected rapidly, I provide in my preferred structure for fastening corner flaps articulated to one pair of walls to reversely folded marginal portions of the remaining pair of walls, so that the simple operation of raising or lifting up one pair of side-walls will simultaneously cause the other pair of walls to lift also, and to cause the corner flaps to move into supporting position, the box being thereupon ready to receive contents.

It is my primary object to provide a machine which will provide for conveying a succession of blanks, performing a succession of operations upon each blank with great accuracy and at high speed, so as to produce a box of the type described in a flat or knock-down form ready for shipment.

In my co-pending application, Serial Number 129,900 filed March 9th, 1937, I have described certain improvements in mechanism for use in carrying out the folding operations incident to the operation of reversely folding the triangular marginal portions of one pair of opposite side walls, the said improvements being described in connection with a machine for forming a box without an extension edge thereon. These improvements may be employed in the machine of my present invention.

I have also devised mechanisms for forming folding boxes similar to those in which my present machine is designed, but without the extension edge as described in United States Letters Patent No. 1,926,364, granted September 12th, 1933, and No. 1,974,408, granted September 25th, 1934.

As compared to the mechanisms of my said co-pending application and my two Letters Patent, my present machine must make provision for a different mode of operation in a number of respects—because the lines of articulation of the corner flaps are not in alignment in the direction of motion with the line of articulation of the side-wall panel therebetween, these flaps and the side wall panel must be folded independently; also it is necessary to form four additional seam areas which must be secured while the blank is travelling, and it is for these reasons and others which will become apparent as the description proceeds, that my present mechanism must provide for a different mode of operation in many respects, as stated.

My mechanism may also be adapted to extension edge boxes having the side walls secured to each other at the corners in ways other than the type described above, and to extension edge boxes in which the side walls are designed to be secured to one another at the corners by frictional or interlocking engagement between corner portions as the walls are erected.

It will be simpler to describe the special objects of the invention after a description of the several forms of blanks and folding manipulations has been set forth, it being noted that my invention has both mechanical and method aspects, and that the invention involved in the same will be set forth in the claims following the specification.

Figures 11, 12, 13:
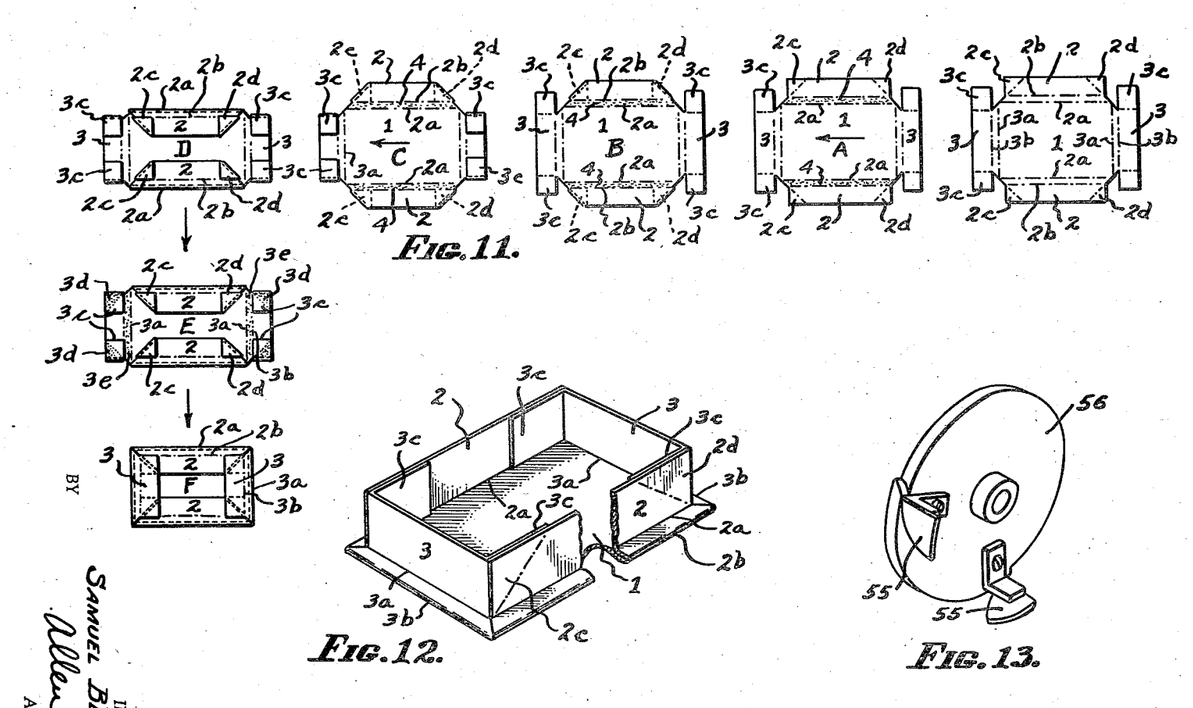
Fig. 11 is a diagram showing the sequence of operations performed in the formation of a certain type of folding box, by use of the mechanism illustrated in Figs. 1 to 10 inclusive.
Fig. 12 is a perspective view of the box illustrated in Fig. 11 after being erected.
Fig. 13 is a perspective of a glue wheel used in the second forming operation.

Referring first to Fig. 11, I show a blank having a main body portion 1, side walls 2, 2 and end walls 3, 3. The blank has score lines 2a, 2a, which define what will be the outer area of the main body panel of the box when it is completed, and there are additional score lines 2b, 2b, which will be the ultimate base of the side walls and which will define the inner area of the box when it is completed. The space between the score lines 2a and 2b at each side of the box will in the completed box be the dimension of the extended edge whereby the main body panel projects from the side walls of the finished structure. There are also score lines defining triangular portions 2c and 2d, at the ends of each side wall, the flaps 2c being the forward ones and the flaps 2d the rearward ones as the blank moves through the initial stages of folding and gluing. The end walls 3 have score lines 3a which define the ultimate base of the ends of the box and the score lines 3b which define the ultimate margins of the ends of the box, the space between the lines 3a and 3b defining as in the case of the side walls, the extension edges at the ends of the box. In other words, the lines 3b and 2b define the inner area of the box when folded, and the lines 3a and 2a define the outer area of the box when folded. It is understood that the terms "sidewalls" and "end-walls" are used here and throughout the description for the sake of clarity and without reference to the relative dimensions of the walls.

The end walls have corner flaps 3c which in the ultimate structure will be adhesively secured to the triangular portions 2c, 2d.

The above description applies to the blank as shown at the right hand end of Fig. 11, generally marked "A". I have marked A, B, C, D, E and F, the diagrams in Fig. 11, showing the several stages in the operation of folding and gluing the structure, it being understood that according to my practice the folding and gluing operations are performed on the blank while it is moving. Stage A in this particular practice consists of applying adhesive to the extension edge areas in bands 4, or to the corresponding portions of the main body panel, or both.

The operations to bring the blank to the illustrated stage B, consists of folding under or to a position against the outer surface of the side walls of the flaps 2c and 2d, the operation requiring turning the flaps 2c rearwardly of the moving blank but turning the flaps 2d forwardly of the moving blank. The glue strips 4, 4 will have an opportunity to dry somewhat during the flap turning operation.

At stage C, the blank will be folded so that the flaps 3c are turned inwardly, overlying the main end wall panels of the blank, and at stage D the side walls are turned overlying the blank along the score lines 2a, thus bringing the triangular portions 2c and 2d uppermost again. It will be noted of this operation that the line of fold along the lines 2a, is in a different vertical plane than the score lines defining the flaps 3c on the end walls, hence the flaps 3c are kept out of the way during this folding operation, this being one of the features of my mechanism and accomplished in this instance by selectively folding them over before folding the side walls. Also it will be noted that the adhesive juncture of the panel between the score lines 2a and 2b will require, in order that it will not immediately spring apart after the folding over operation, that some means must be provided for applying pressure to the overlying parts.

It will be noted that the seam portions must be caused to adhere rapidly because of subsequent operations to be performed on the blank; it is further to be noted that this requires the individual application of pressure to each blank, and that a uniform pressure roller under which the blanks pass would not accomplish this result because of the greater number of thicknesses of board that are folded on the inner area of the blank, as compared to the two thicknesses that define the extending edge between which two thicknesses adhesion is desired. I therefore provide localized pressure means confined to the folded area with adhesive therebetween, positioned so that these means do not bear on the actual line of fold itself, as pressure upon this actual line of fold would tend to crack it or split it, making the box unsightly.

The sequence of operations in stage D and stage C as illustrated, may be reversed, provided some selective step is taken since the folds are not along the same line.

The blank is then brought to stage E, the operations consisting of applying adhesive to a triangular area 3d on each of the flaps 3c, and also applying adhesive over the zone 3e defined by the score lines 3a and 3b, or the corresponding portion of the main body panel or both. This adhesive application is accomplished preferably after the orientation of the blank with respect to its direction of motion has been changed. Instead of applying the adhesive to the areas 3d, it could be applied to the triangular flaps 2c and 2d at each side of the carton.

The final stage F, shows the portions then at the sides of the moving blank in the direction of motion, but formerly at the front and back thereof, folded in along the lines 3a to form the completed blank wherein the triangular flaps 2c and 2d are adhesively joined to the flaps 3c and the extension edge panel, at what is now the sides of the moving blank being formed, and caused to adhere to the corresponding portion of the main body panel. Again, it is necessary to provide for a proper application of pressure to the said extending edges. The completed box as shown in Fig. 12 is erected by lifting upwardly on the one pair of walls 3 of the structure as shown in Fig. F, whereupon the opposite walls will lift and the corner flaps of the structure will move into reenforcing position, the portions of the end flaps 3c which are not attached to the diagonal flaps swinging across the bottom of the box structure, and serving to hold the side walls and corners erect because of their engagement with the bottom 1 of the box.

Figure 14:
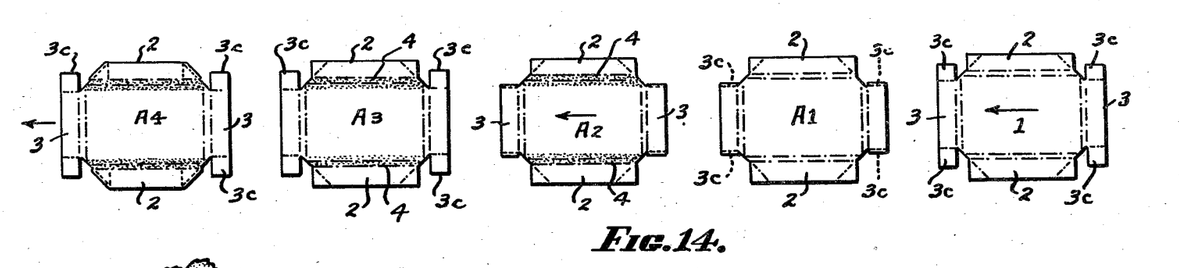
Fig. 14 is a diagram showing a second method or sequence of forming the box of Fig. 12.

I have shown in Fig. 14, a series of steps in connection with applying adhesive in the initial stage A in Fig. 11. The stations are marked A—1 to A—4 inclusive, and show more particularly the act of flap selection at station A—1, the end panel flaps 3c are turned downwardly, permitting continuously acting glue wheels to apply the adhesive bands 4, without coating the said flaps as at stage A—2. At stage A—3 the flaps 3c are permitted to return to original positions. At stage A—4 the triangular flaps are folded under, this being an alternative practice to that of Fig. 11.

Figure 16:
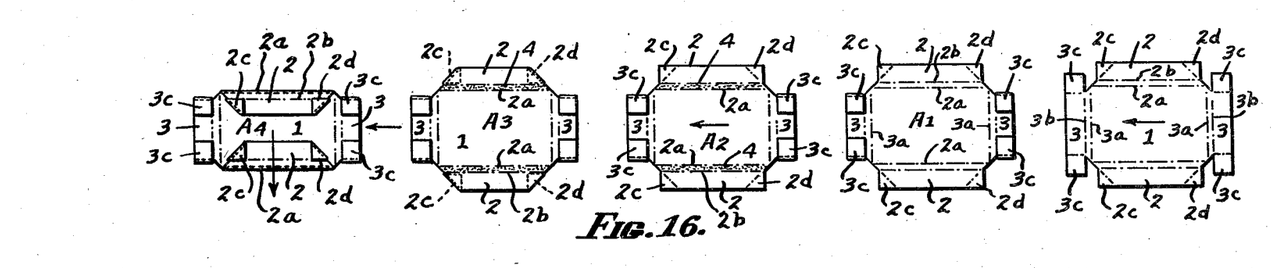
Fig. 16 is a diagram illustrating a third method or sequence of forming the box of Fig. 12.

Another practice with the same object in view is illustrated in Fig. 16. Here at stage A—1, the flaps 3c are folded inwardly over the end panels as the initial operation. While they are out of the way continuous glue wheels will apply the adhesive bands 4,4 as at station A—2. At station A—3, the diagonal tabs 2c and 2d are turned under, and at station A—4 the side panels are turned inwardly over the main body panel.

Figures 18, 19:
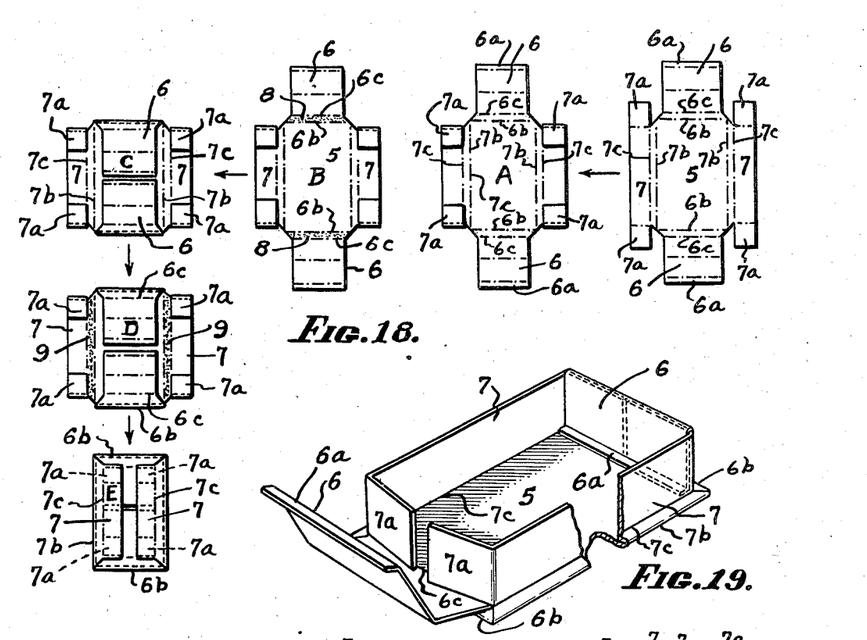
Fig. 18 is a diagram showing steps in forming from a blank another or second type of box.
Fig. 19 is a perspective of this second type of box in partly erected condition.

In Fig. 18, I have illustrated another form of box, this time one which is not adhesively joined at the corners but which can be set up to form an extension edge box. In this instance the main body 5 of the blank shown at the right has side walls 6, 6 and end walls 7, 7. It should be noted that in none of the description are sides and ends used as having any particular significance except for convenience of description, because the boxes can be absolutely square with no distinction in dimension between the sides and ends thereof. In the particular instance the walls 6, 6 are termed side walls of the blank because they are at the sides during the initial folding and gluing operation. The front and back walls 7 have end flaps 7a and the side walls 6, 6 have additional panels attached thereto which are provided for folding over flaps 7a in setting up the box as will be described. There are score lines 7b and 7c, defining the extension edge zone at the front and rear of the blank, and score lines 6b and 6c defining the extension edge zone at the two sides of the blank. The flaps 6 also have score lines 6a defining a narrow end panel to fold outwardly against the bottom of the box, when the walls 6 are bent over and tucked in in the act of erecting the same.

As in the instance of the first blank, the score lines defining the flaps 7a and the score lines 6b and 6c, are each in a different vertical plane. In the operation of forming this box, I form the box from this blank.

The blank as now described in Figure 18 is moved forward in the direction shown, and the panel 6 is depressed somewhat by guiding means so that the flaps 7a which are connected by scores which are in alignment in the direction of motion, can be folded over on the panels to which they are attached, as indicated at stage A. Thereafter these flaps are held in folded down condition, and adhesive is applied as indicated at 8 on the extension edge zone, or on the corresponding portion of the main body panel, or both (stage B). The extending panels 6 are thereafter folded inwardly along line 6b, leaving the blank in condition as shown at stage C. Pressure is then applied to secure the adhesive areas, thus completing the initial stage in forming of the box.

The blank is then delivered to conveying mechanism which will convey it in a different orientation to its line of movement to facilitate folding operations at what were the front and back edges of the moving blank that are now the side edges of the moving blank. To bring the blank to the condition shown at D, in Fig. 18, adhesive is supplied in the zones 9 as defined by the score lines 7b and 7c. The final operation which consists of folding the sides 7 of the moving blank inwardly over the blank and applying pressure over the extension edge zone along the sides of the blank, brings the same to the condition shown at E in Fig. 18.

To erect the box the panels 7 are lifted up, the flaps 7a turned in at right angles thereupon and the walls 6 folded up and then tucked down inside the box with the end portions defined by the fold line 6a laid against the bottom of the box, as shown in Fig. 19.

Figures 20, 21:
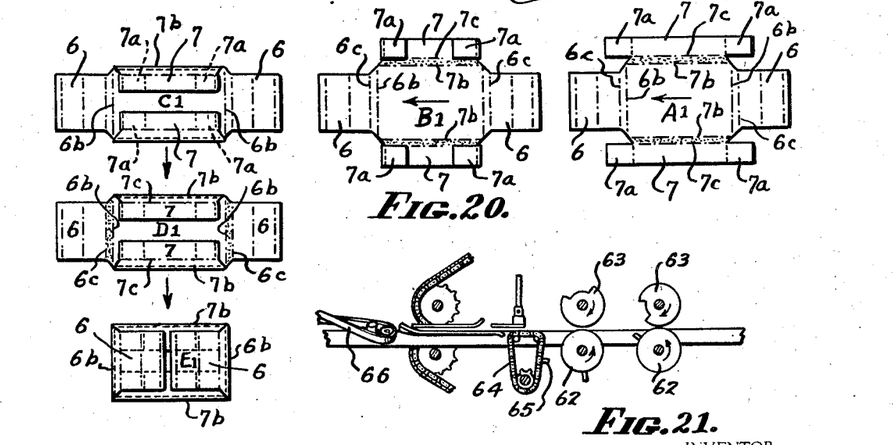
Fig. 20 is a diagram showing an alternative method or sequence of operations for forming the box of Fig. 19.
Fig. 21 is a side elevation of mechanism employed in the method or sequence of Fig. 20.

Instead of proceeding as in Fig. 18, the box of Fig. 19 can be made by reversing the initial and secondary directions of motion of the blank in relation to its travel. Thus in Fig. 20 is shown an alternative. Thus at stage A—1, the blank has adhesive applied to it along the lateral extension edge zone defined by the scores 7b and 7c at each side of the blank. At stage B—1 the two flaps 7a, which as the blank is moving extend from side panels of the moving blank, are turned over, the leading flaps by a simple folding operation and the rearward ones by an operation in which the flaps are laid over in the direction of motion of the blank. Then adhesive is introduced on the extension edge zone or the corresponding portion of the main body panel, or both. Next at stage C—1, the side panels 7, of the blank, are turned inwardly, and pressure applied to the extension edge zone, in this instance requiring narrow pressure applying means. Then orientation of the blank to its path of travel is changed, and at stage D—1 adhesive is applied to what is now the extension edge zones along the sides of the moving blank. Finally at stage E—1 the panels 6 are folded over on the score lines 6b, 6c, again requiring selective pressure to secure the adhesion at the extension edge zone.

Figures 24, 25:
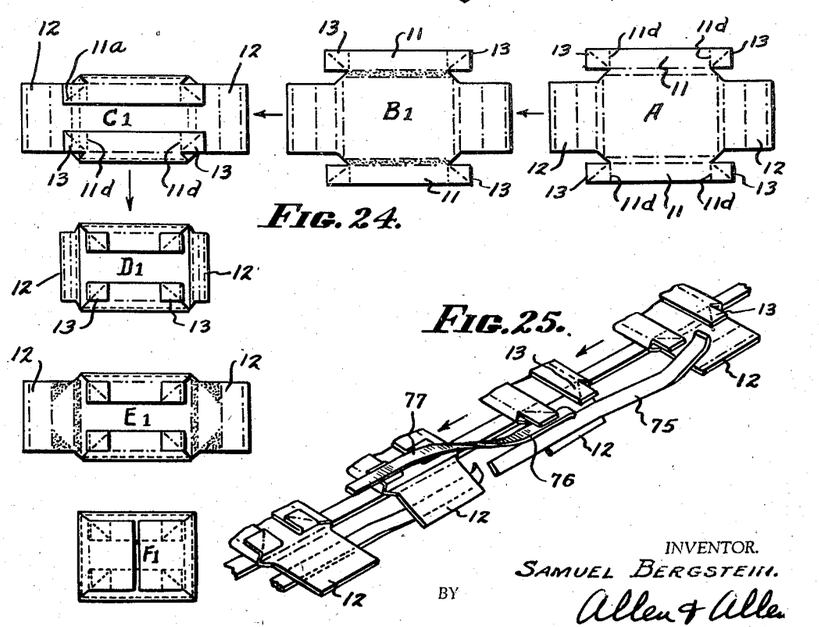
Fig. 24 is a diagram showing an alternative method or sequence of steps for forming the box of Fig. 23.
Fig. 25 is a fragmentary perspective showing apparatus employed in the method of Fig. 24.

As illustrated in Fig. 18, I prefer to turn the corner flaps 7a inwardly upon the side walls 7 because with this procedure a continuous glue wheel may be used and the box after completion in its knock down form is more convenient for shipping and setting up. It is to be noted however, that the box may be formed without turning the flaps 7a at any stage of the operation. This would of course, require a timed glue wheel and selective folding of the side walls 6. The knock down box thus formed would be as seen at stage E, Fig. 18, but, with the flaps 7a extending outward somewhat beyond the main body panel of the box. In regard to the procedure and orientation of the blank as illustrated in Fig. 20, it is not imperative that the flaps 7a be turned over against the panels 7 in the initial direction of travel. However, if the flaps 7a are not turned or folded in this initial travel it will be necessary to employ selective folding of the flaps 7a and walls 6 before applying the adhesive in the second direction of travel. A means by which this may be accomplished is illustrated in Fig. 25 and will be later described.

Figures 22, 23:
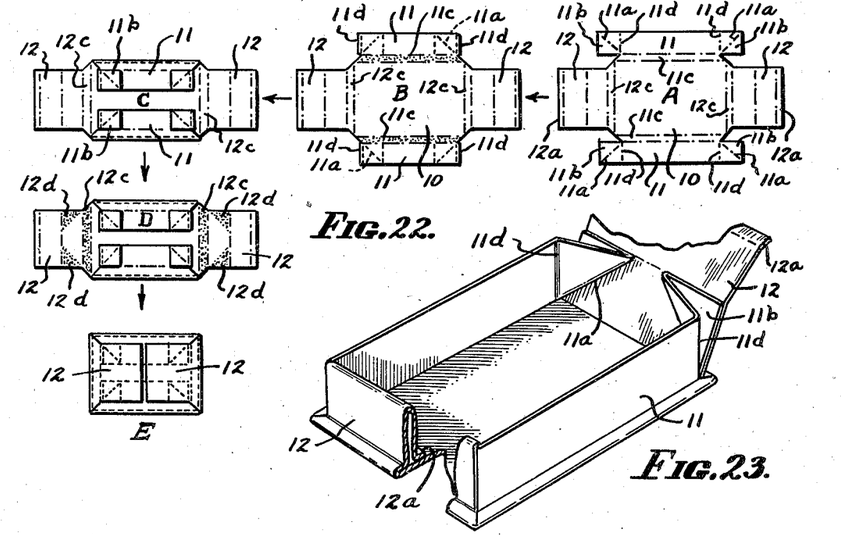
Fig. 22 is a diagram showing the operations of forming a third type of box. This box is similar to the box of Fig. 19, but having corner flaps attached to one pair of walls adhesively joined to the opposite pair of walls.
Fig. 23 is a perspective view showing a box formed in accordance with Fig. 22, in the act of being erected.

Referring now to the blank shown in Fig. 22, the body of the blank is indicated at 10, having sides 11 and ends 12. The corner flaps articulated to sides 11 are divided by a diagonal crease line 11a, defining one triangular portion of said flaps which is designated as 11b. The extension edge panels 11c and 12c are defined by crease lines as in the previous blanks, while the end walls 12 have additional panels articulated thereto, which are designed to be folded to overlapped position when erecting the box, to hold it in erect condition.

Two steps are necessary to bring the blank to the condition illustrated at diagram B. One of these consists of folding back the end flaps along score lines 11d, which may be accomplished by a ribbed and pocketed mechanism with the ribs parallel to fold lines 11d, that is a mechanism similar to that previously described but not operating angularly in regard to the blank. The other step is the application of adhesive to the extension edge panels 11c, or to the corresponding portion of the main body panel, or both, and as at B the adhesive is shown applied in this instance to the extension edge panel alone.

To bring the blank to the condition illustrated at stage C, the side panels 11 are folded to overlie the main body panel, as described in previous instances, and individual pressure is applied to the portions of the blank with adhesive therebetween, to effect adhesion therebetween. As these sides 11 are folded over, the end flaps are retained in folded back condition, as illustrated. This completes the operations in the initial direction of travel and the blank is ready for the next operation while moving with its orientation to the line of travel shifted to bring the portions 12 to the sides of the moving blank.

The next stage D, shows the application of adhesive to the extension edge panels on the ends of the box, and also triangular portions of adhesive applied as indicated at 12d. Here again the adhesive on the zones 12d might have been applied to corresponding portion of main body panel in addition, or the triangular adhesive areas 12d might have been applied to panels 11d, which are the corresponding meeting surfaces of these triangular portions when the end walls are folded over as illustrated in the next stage E.

As shown in stage E, the end panels have now been folded over and pressure applied to cause adherence of the extension panels, and also pressure to cause adherence between the end panels where the glue application has been indicated, and panels 11b.

To erect the blank, the sides are raised, which serves to also lift the end panels back into an upright position, by causing a fold along score lines 11d, as illustrated in Fig. 23. The extending end panels 12 are now folded down over these triangular portions, bringing flaps 12a into frictional contact with the bottom of the box, and retaining the box thereby in erect condition ready for use.

It is to be noted that in the foregoing description of Fig. 23 that selective folding of the corner flaps and panels 12 is not readily apparent. However, as the corner flaps are folded in the first direction of motion, and the panels 12 are folded in the second direction of motion, a selective folding of these members is therefore accomplished along their individual score lines.

Another way of making the box of Fig. 23, which involves a different mode of selecting flaps, to the exclusion of others extending in the same lateral zone, but requiring a folding on a different line, is shown in Fig. 24.

In this example, (Fig. 24), I have shown the blank oriented at the start in the same way as in Fig. 22. At stage A, the blank is the same. At stage B—1 the adhesive has been applied along the extension edge zone at the sides of the blank. At stage C—1 the side panels have been folded over and caused to adhere at the extension edges, but without any operation on the terminal flaps or portions of the side panels. This brings the blank to a point for change of orientation to path of travel.

In the new path of travel, the first operation is to deflect downwardly the flaps 12, 12, removing them from the path of deflectors which engage under and turn inwardly the flaps 13 on the lines 11d. This brings the operation to stage D—1. Thereupon the flaps 12 are permitted to extend to their former position and adhesive is applied as at stage D in the practice illustration in Fig. 22, and the final step is the same to form the completed articles of stage F—1.

It will be noted from the foregoing descriptions that in common to all of the operations is the folding inwardly from four sides of a blank all portions projecting from the main body portion with adhesive joints formed between all four edges of the main body panel of the blank and corresponding portions of the side walls, adjacent the line of fold, and thereafter forming a two-ply extending edge on all four sides of the main body portion. Also incident to the operations is the necessity of folding over extending portions of the blank along margins independent of folds made on other portions projecting from the margins, certain of said lines of fold defining edges of the inner area of the folded box, and other lines of fold defining the edges of the outer area of the folded box. In common with the practices of my co-pending application and my two previous patents, in some at least of the indicated practices, it is necessary to reversely fold certain portions of the sides of a moving blank and then fold the entire sides inwardly to form the double ply extension edge portion. As has been noted, the presence of various thicknesses of material except at the marginal portions of the blank, requires the provision of means to apply pressure selectively to these marginal portions. Among other things, I may employ heaters for partially drying the adhesive before applying pressure, because it will be necessary in the operation to make the extension edge portions of the blank positively adherent before the completed structure is delivered from the machine, since in every instance the area defined by the extending edges around the inner area of the box has but two plies or thicknesses, while within the inner area there are portions with three or more plies or thicknesses, it is obvious that by the practice now in use of depositing folded blanks with adhesive therebetween in lapped or piled condition between conveyor pressure belts, for effecting adhesion, that such pressure would be concentrated within the inner area of the folded blank particularly where the greatest number of thicknesses are in overlapped relation, without any pressure whatever on the extending edges of the box where it is essential for adhesion to take effect.

I am not aware of anyone previously having provided mechanism capable of forming seams between all four edges of the main body panel of a blank and the corresponding side wall portions, with incidental folding and adhering of corner portions being accomplished simultaneously therewith if desired. Also, so far as I know, no one has previously effected the infolding of portions extending laterally from a travelling blank, along separate and distinct lines of fold, certain of said lines of fold defining the edges of the outer area of the blank, and certain other of said lines of fold defining the edges of the inner area of said blank.

Referring now to the mechanical device, illustrative of my invention, I have not attempted to show in great detail the frame-work and driving connections, particularly where these have been shown in my co-pending application, Serial No. 129,900, to which reference is hereby made.

Figure 1:
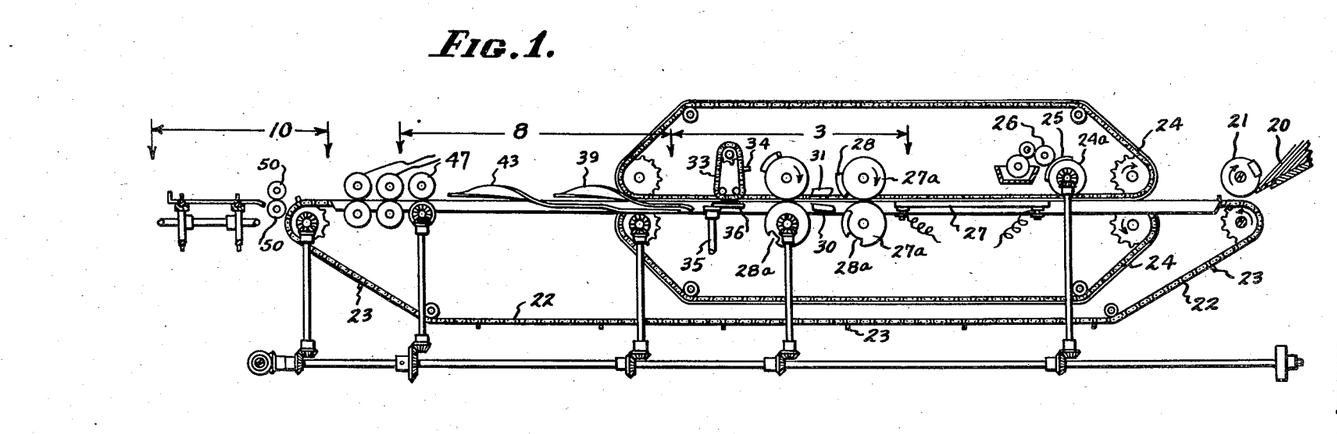
Figure 1 is a side elevation showing a preferred mechanism whereby the initial folding and gluing operations may be performed.

Referring to Fig. 1, a series of blanks 20 are delivered by a feed mechanism indicated generally at 21, to a pair of endless feed chains 22, having pins 23 thereon to engage the rearmost edges of the blanks, and carry them one at a time in spaced relation through the several manipulations that have been described. In addition, as shown in my co-pending application, Serial No. 129,900, I will employ positively driven friction feed devices 24 to effect a more positive gripping of the blank across its median portions as it is fed along than will be provided by the feed chains 22, and abutments 23.

In my preferred operation, the blank is advanced, adhesive being applied to what is termed the extension edge zone or the corresponding portion of main body panel, or both. For this purpose a pair of glue wheels 24a having properly dimensioned and located pads 25 thereon, and receiving glue from the glue rolls 26, are provided.

It will be preferable to provide a heater in the form of bars 27 which underlie or overlie, or both, those portions of the blank, at least to which adhesive is applied, over which bars the blank travels as it emerges from engagement with the glue wheel pads.

Figure 3:
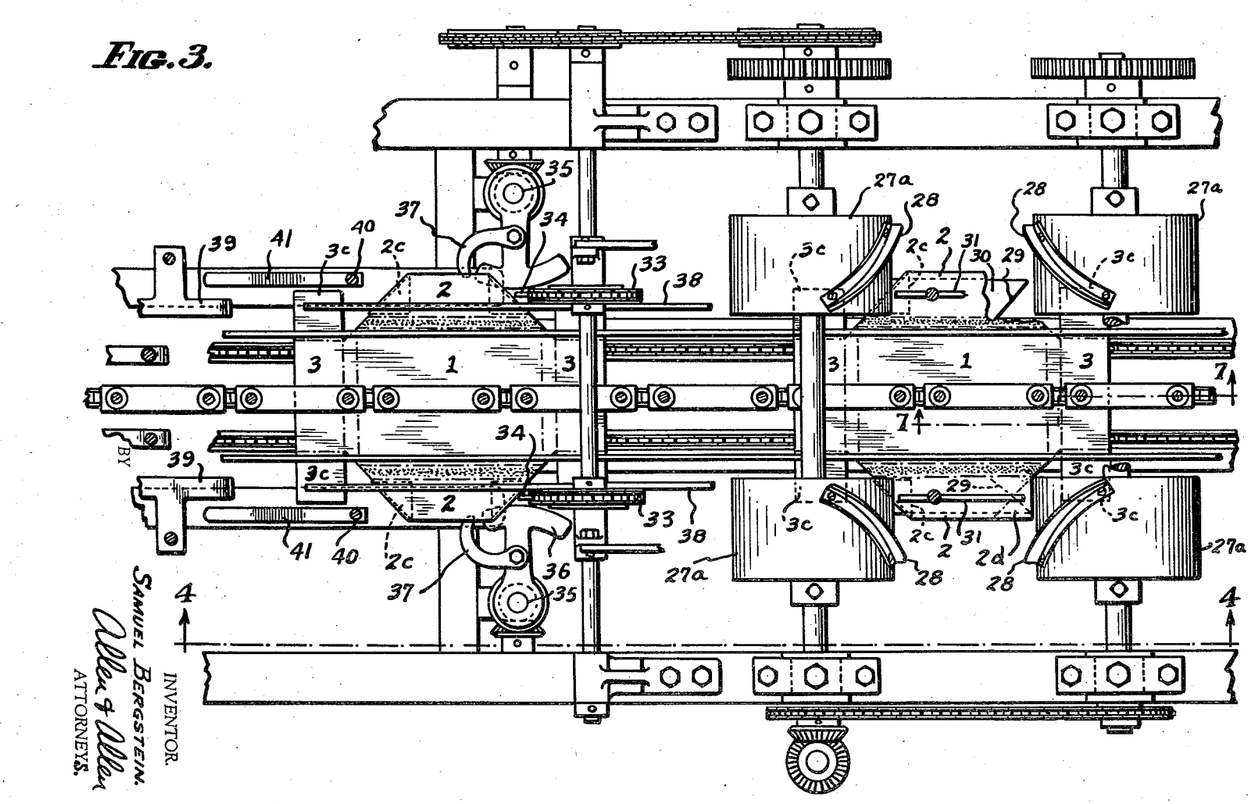
Fig. 3 is an enlarged detailed plan view taken along line 3 of Fig. 1, showing the triangular flap folding apparatus and means for separating the side walls and end flaps of the box.
Figures 4, 5, 6, 7:
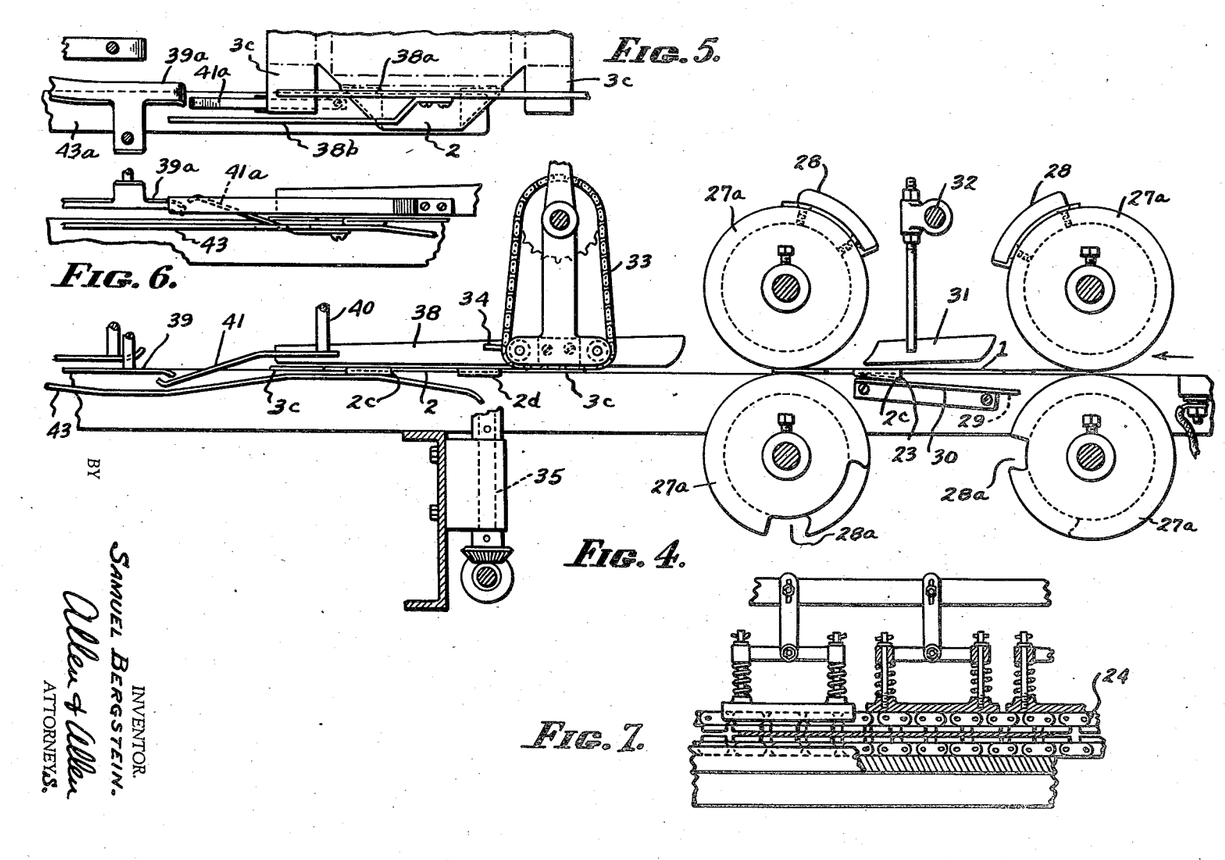
Fig. 4 is a sectional side elevation taken along the line 4—4 of Fig. 3.
Figs. 5 and 6 are respectively a plan view and side elevation of a modified means for separating the side walls and flaps of the box.
Fig. 7 is a section taken along line 7—7 of Fig. 3.

If the operation is to include the folding down and under of triangular portions on the ends of the sides of the blank, this operation may follow the initial adhesive application and is accomplished by two pairs on each side of the machine, of driven rolls or wheels, between which the lateral margins of the blank will pass. These wheels are marked generally as 27a and the upper ones have ribs 28 thereon, while the lower ones have pockets 28a therein, into which the ribs pass as the wheels revolve. The ribs as shown in Figs. 3 and 4 are arranged spirally on the upper wheels so that when they sink into the pockets in the lower wheels at least one edge of which pockets are correspondingly sloped or spiralled, they will define a diagonal fold line. The first set of the wheels to meet the blank shown in Fig. 11 will turn down the advancing triangular flaps 2c, whereupon these flaps will contact the angling face 29 on the pair of plates 30, one at each side, which will fold the flaps 2c downwardly towards the under side of the edges of the blank, the blank being prevented from rising by a pair of overlying plates 31, adjustably held on a cross bar 32 over the table of the machine. The margin of the blank will then pass between the plane portions of the next set of rollers or wheels 27a, which will additionally secure the folded back position of the flaps 2c, whereupon the ribs 28 on the second set of wheels will strike the triangular flaps 2d, Fig. 11, and turn them downwardly into the pockets in the lower matching wheels of this second set.

The rearward flaps 2d are then swept forwardly to a position underlying the edges of the blank by mechanism described in some detail in my said co-pending application, Serial No. 129,900, this mechanism comprising an initial flap depressing member and a sweep device, the flap depressing members comprise chains 33 having depressing pins 34 thereon timed to contact the initially folded down flaps 2d, and push them vertically downward. As best seen in Fig. 3 the sweeping mechanism is mounted on a driven vertical shaft 35, and consists of a sickle-like sweep 36, with a supporting finger in advance of the sweep indicated at 37. Located immediately above the point of contact of the sweeps are a pair of narrow hold-down bars 38. The result is that the supporting fingers 37 swing underneath the side edge of the blank without contacting the depressed triangular flaps 2d, whereupon the sickle-like sweeps 36 strike the flaps and moving more rapidly than the blank, fold them under, the margin of the blank being protected against moving either downwardly or unwardly during this folding operation.

Figures 8, 9:
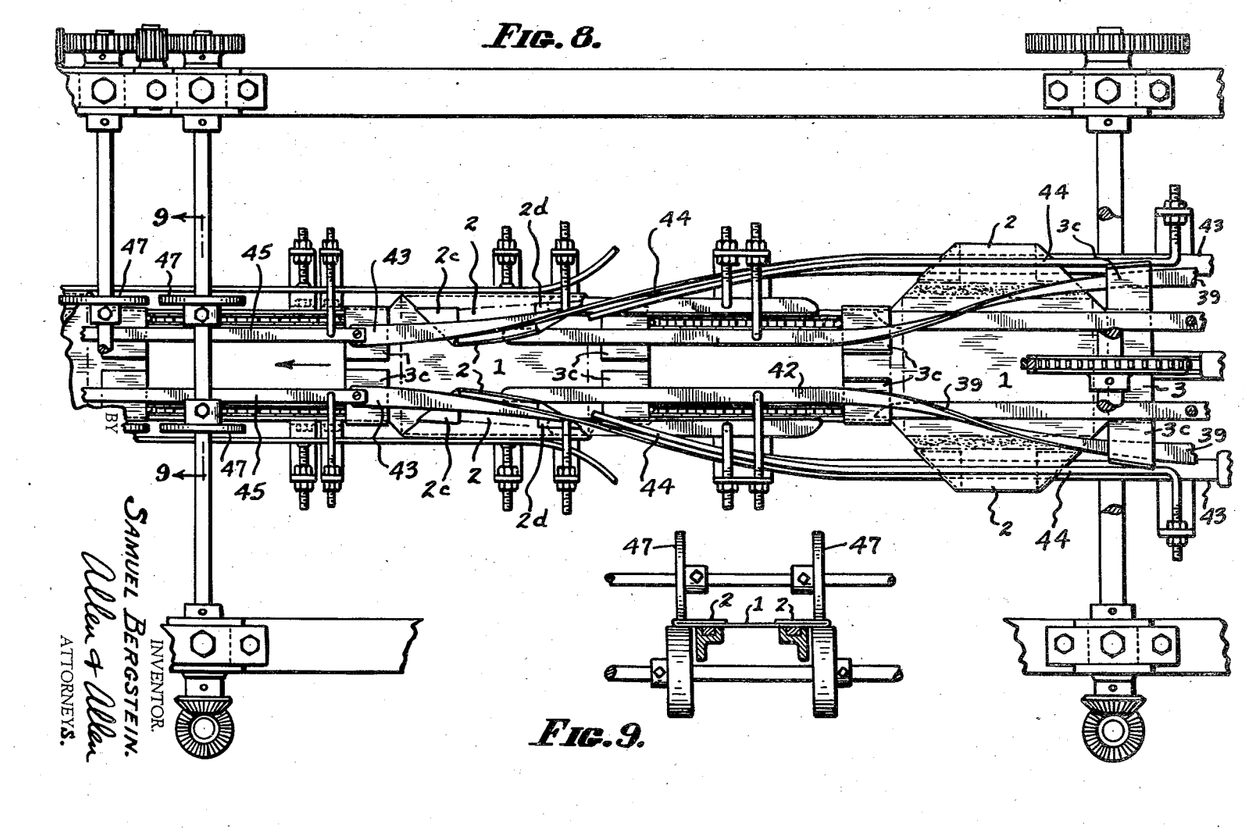
Fig. 8 is a plan view taken along line 8 of Fig. 1, showing a preferred device for folding in the side walls and for maintaining the diagonal flaps in folded over position.
Fig. 9 is a section taken along line 9—9 of Fig. 8.

The blank will then have reached stage B of the operation thereon, and it will be necessary to move the flaps 3c either out of the way of folding mechanism for the side panels 2, or to first fold the flaps 3c, either of which operations require a selection of laterally extending flaps. In the practice illustrated principally, the operation is directed to completing the initial fold of the flaps 3c. Referring to Figs. 3 and 4 the first thing which takes place is that fingers 41 mounted on post 40 at each side of the machine, engage the laterally projecting side panels 2 without engaging the flaps 3c. Hence the side panels are caused to pass under longitudinally extending bars 39, whereas the corner flaps 3c ride to the top of these bars. Referring now to Fig. 8 the bars 39 are inwardly curved so as to force each of the corner flaps to fold over to the top of the blank as the blank moves along, thereby causing them to pass under the lengthwise extensions 42 of the members 39 serving as hold downs. When the entire blank is engaged by the extensions 42 the blank has progressed to stage C of Fig. 11. The lengthwise extending plates 43 underlie the side panels during the progress of the blank last described. These plates 43 are curved to fold the side panels over so that they overlie the carton blank, the rods 44 having prevented the under-turned flaps 2c, 2d from springing away up to this stage.

In Figs. 5 and 6 I have illustrated a modified form of flap separators. Here a flat spring member 41a is arranged to lift the flaps 3c upward causing them to ride up over the turn-over plate or bar 39a. The side walls 2 will pass beneath the plate 39a due to the hold bars 38a and 38b which prevent the light spring 41a from lifting the walls. Thereafter the side walls will be turned over against the blank by the turn over plates 43 as described previously.

Hold downs 46 now engage all of the inturned flaps and the blank has progressed to stage D (Fig. 10), whereupon its direction of feed is changed, in this instance by delivering it to a mechanism which moves the blank at right angles to its former movement. It is also practical to make a 90° turn to the blank and still feed it in the same direction, the essential being a change in orientation with respect to the path of travel.

It is important to note that before the blank moves from stage D of the delivery to the new conveyor mechanism that feeds it at right angles, pressure is applied to bind the adhesive junctures at the lateral extension edges of the blank. This is accomplished by pressure rollers 47 (Figs. 8 and 9), which pressure rollers it will be noted engage only the extension edge portions of the blank along its sides, and furthermore said pressure rollers do not engage the extreme edges of the said extension edge portions. As already noted in the particular blank, the result of applying a pressure roller which extends uniformly across the blank will be to apply no pressure to the extension edge zone because of the thickness of the various inturned flaps in the middle zone of the blank.

Since the adhesive has had some opportunity to dry at this point, and in addition will preferably have been accelerated in drying by heat or air currents the result of this pressure will be to so securely bind the juncture along the said extension edge zones that the side panels will not spring up again.

In the condition then as shown at D in Fig. 11, the blank is advanced to the second general stage of operation.

Figure 10:
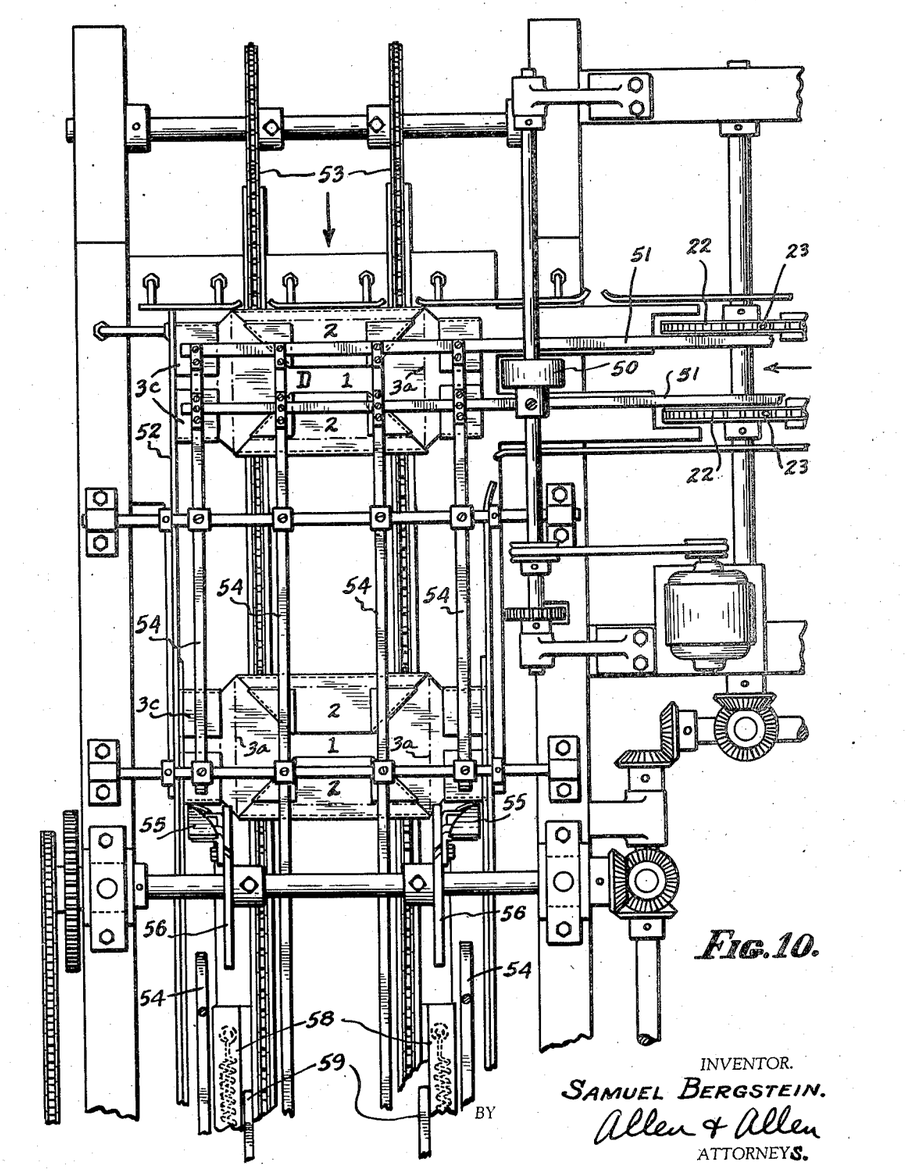
Fig. 10 is an enlarged detailed plan view taken along line 10 of Fig. 2 showing mechanism used in the second stage of operations.

As shown in Fig. 10, the blanks are successively engaged by a pair of wheels 50, as they leave the main conveyor chain 22, the inwardly folded portions being kept in place by hold-down strips 51, extending across the table of the second half of the mechanism. As the blanks come up against the side abutment 52 in the second half of the mechanism, they are picked up by abutments on a pair of feed chains 53, which carry them through the glue applying and final folding and pressing operations. There are hold-down strips 54 extending along above the conveyor chains, which prevent the several inturned portions of the blank from springing upwardly.

Adhesive is next applied to the blank by means of two sets of gluing devices, one set has pads 55 which are of a shape to apply the triangular pads of glue as at 3d (Fig. 11); the other which may be on the same shaft as pads 56, which supplies the adhesive to the extension edge zone 3e, (Fig. 11). Adhesive is supplied to these pads from glue rolls 57, in the usual way, and as before, heater bars 58 may overlie or underlie, or both, the extension edge zone along what are now the sides of the moving blank.

The blank then passes beneath folding plates 59, the outer sides of which define a line coincident with the score 3a, at each side of the blank.

The two outer hold-down strips 54 begin to curve inwardly and upwardly so as to retain the flaps 3c in their folded position against the walls 3. Immediately beneath this curved portion of the strips 54 are the regular twist plates 60, (Fig. 2) which engage the entire outstanding free edge of the moving blank and cause it, as it moves, to fold inwardly to the final position shown at F in Fig. 11. Whereupon again the blank encounters a series of narrow pressure rolls 47a which engage along the extension edge zone at what is then the sides of the moving blank. There may also be a pair of rollers 61 for pressing down the adhesively joined triangular portions. The blank is then delivered to any usual stacking device as indicated generally at 62, and the operation is complete.

Figure 15:
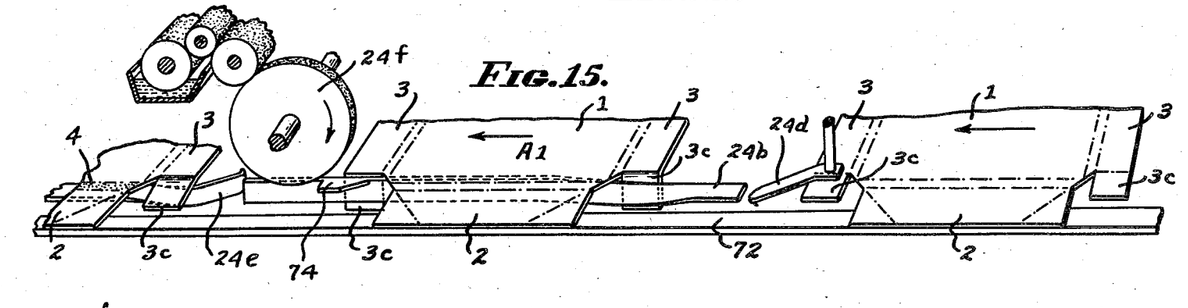
Fig. 15 is a fragmentary perspective of apparatus used in the sequence of Fig. 14.

In Fig. 15 is shown a structure which can be inserted between the blank delivery 21 and the glue wheels permitting the use of a continuous glue wheel for applying the band of adhesive 4. This mechanism is a flap selector consisting of spring fingers 24d which engage and turn the end flaps 3c, so that they pass under the laterally projecting bars 24b, the said finger 24d not deflecting the projecting side panels of the blank, because of support 72 under said panels, but since this support does not extend under the end panels 3c, these are deflected. While the blank is being fed in this manner, the continuous glue wheel 24f will distribute the bands of glue 4 along the extension edge zone of the blank, there being a support finger 74 projected outwardly from the bars 24b at the point of application of adhesive, to underlie the extension edge zone more substantially at the point of adhesive application. As the blank moves under the glue wheel, bars 24e engage the downwardly deflected flaps 3c and cause them to return to projecting position, whereupon the blank moves through the same stages as described in the first instance.

Figure 17:
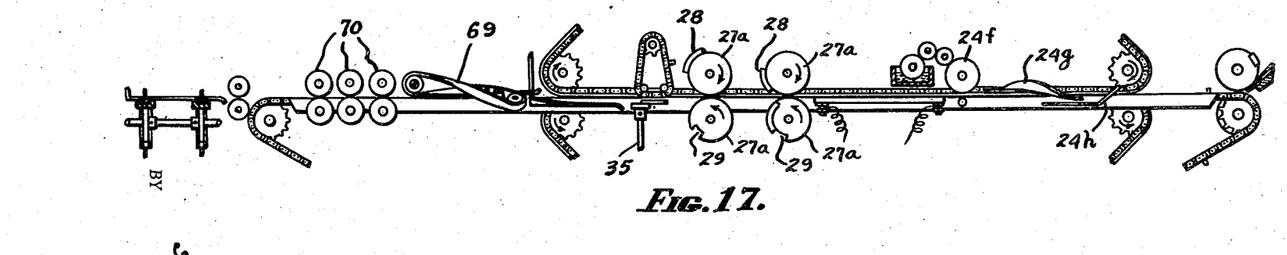
Fig. 17 is a side elevation showing mechanism employed in the sequence of Fig. 16.

Another alternative, as explained in connection with Fig. 16, is shown in Fig. 17. Here instead of deflecting the laterally projecting flaps 3c downwardly, they are engaged as a starting operation by means of guides 24g, which turn them upwardly and down over the moving blank. These guides do not contact the main side panels, because the side panels are deflected downwardly by deflector plates 24h, which are wide enough spaced to contact the projecting edges of the side panels, beyond the edges of the flaps 3c. Under such circumstances it is true again that the glue wheels 24f can traverse the extension edge zones at the sides of the blanks, without danger of getting adhesive on the flaps 3c. In the construction of Fig. 16, hold down bars for the flaps 3c, after they have been turned inwardly, will have to be provided. These are not shown in Fig. 17, but their structure will be readily understood. The blank is then at the stage A—I.

Thereafter continuous glue wheels 24f will apply adhesive in bands 4 along the extension edge zone, which bands 4 as noted, may be either just inside or just outside the score lines 2a of the blank or both. Thereupon the blank proceeds through the stage of turning under the triangular flaps on the ends of the side panels in the manner already described.

There having already been a selection or deflection away of the end flaps 3c, a twist belt 69 may be used to turn inwardly the side panels 2, and the blank will have progressed to stage A—4, whereupon a series of narrow pressure rollers 70, will press down to secure the adhesive junction at the extension edges of the sides of the blank and the blank will be ready for delivery to the final gluing and folding operation already described.

Figure 2:
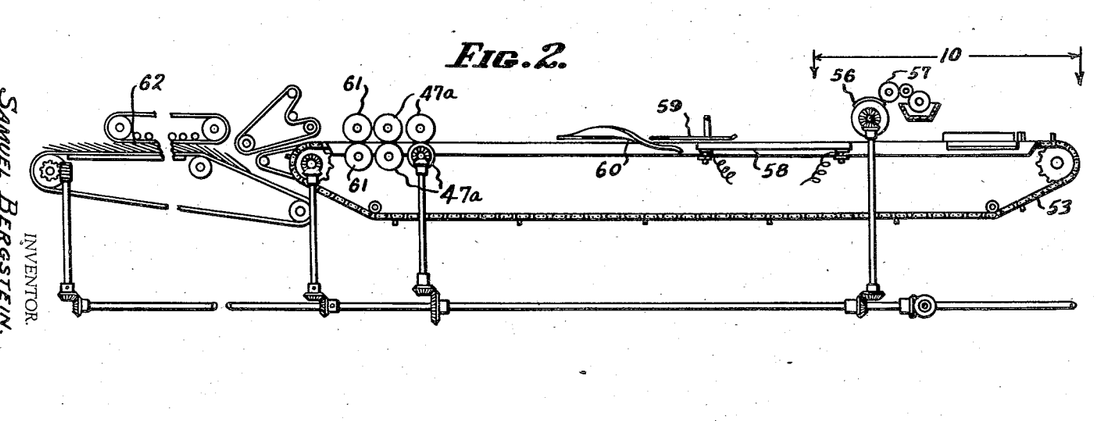
Fig. 2 is a side elevation showing the mechanism for forming the concluding folding and gluing operations.

Referring to the blank illustrated in Fig. 18, and the operations thereon, it will be noted that the ribbed and pocketed rollers 27 of the machine of Figs. 1 and 2, can be made inoperative by moving them out of position, along with the co-acting parts having to do with folding the triangular portions, whereupon the machine will function as has now been described, except that there will be no necessity for the triangular shaped glue pads in the second stage of operations.

Instead of manufacturing the box form shown in Fig. 19, by the original folding mechanism just described in connection with Fig. 18, the pocketed rollers may be altered so that instead of operating to turn under the flaps 7a in this instance, as illustrated in Fig. 20 at A', the pockets are in the upper rollers 63, and the projections on the lower rollers 62. This results in turning the two advancing flaps upwardly and the two rearward flaps upwardly. Instead of locating the chain 31 with its pin 34 above the path of travel of the blank, I provide a chain 64 with a pin 65 located below the path of travel of the blank. Also the sickle like sweeps will be arranged to operate above the level of the blank. As a result the flaps 7a, 7a will be turned to overlie the blank, and since there are no end flaps to interfere, the twist belts 66 may be simply employed to fold in the entire side panels 7. This arrangement is illustrated in Fig. 21.

In the second stage of operation in manufacturing the box of Fig. 23, as illustrated in Figs. 24 and 25, it is necessary to select the side panel flaps 11a from the projecting flaps 12 then at the sides of the blank. As shown in Fig. 25, lengthwise bars 75 are located along the sides of the machine so as to engage the flaps 12 and deflect them downwardly, thereupon a set of bars 76 which lie just on top of the bar 75, but inwardly therefrom, will engage under the flaps 11a as the blank moves along, and said bar 76 will have a twist portion 77 that folds the flaps 11a over.

In Fig. 25 the portion 77 is cut away, but it will be understood that it extends along so as to serve as a hold down for the turned over flaps 11a. With the blank in the position shown at D—1, a glue wheel such as illustrated at 78 in Fig. 13, will apply the triangular adhesive spots by means of the plates 79, and the lengthwise extension edge zones by means of the main body of the wheel, bringing the blank to the stage E—1. Thereupon by means of twist belts the projecting lateral flaps 12 will be turned over and the blank will be complete, as in F—1.

In the practice illustrated in Fig. 22, the operation will be as described except that the ribbed and pocketed wheels will be arranged to turn under along a line at right angles to the moving blank instead of diagonally to the moving blank.

The gluing operation in the second stage of operation will be alike to that which has been described.

I am not aware of anyone previously having provided mechanism capable of forming seams between all four edges of the main body panel of a blank and the corresponding side wall portions, incidental folding and adhering of corner portions being accomplished simultaneously therewith if desired. Also so far as is known, no one has previously effected the infolding of portions extending laterally from a travelling blank along three separate and distinct lines of fold, no two of which are successively in alignment in the direction of motion.

Having thus described my invention, what I claim as new and desire to secure by Letters Patent is:

1. In a machine for making boxes having extension edges, in flat or knocked-down form, from cut and creased blanks having side-walls connected to the main body panel by intermediate panels, and one pair of opposite side-walls having corner flaps articulated thereto, means for moving said blanks along, and in the course of motion means for making two separate lines of fold defining two exterior edges of the box while the blank is moving parallel to said lines of fold, and means for making six other independent lines of fold, while the blank is moving parallel said six lines of fold, four of said lines of fold being at corners and defining the interior area of the box, and the other two of said lines of fold defining the remaining exterior edges of the box.

2. In a machine as described, means for moving said blanks along in direction of motion transverse to the walls having corner flaps articulated thereto, and means for infolding opposite walls independently of means for infolding said corner flaps, the lines on which said opposite walls are folded being parallel to, but not in alignment with, the lines on which said corner flaps are folded.

3. In a machine as described, means for moving said blanks along in direction of motion transverse to the walls having corner flaps articulated thereto, and means for infolding opposite walls independently of means for infolding said corner flaps and securing intermediate panels connecting said walls to corresponding portions of the main body panel, while said blank is in motion.

4. In a machine for making boxes of the character described, means for folding one set of opposite walls and adhesively uniting the base portions of said walls to corresponding portions of a main body panel, while the blank is moving in a direction parallel said walls, and means for folding the remaining set of opposite walls and adhesively uniting the base portions of said remaining walls to corresponding portions of main body panel, while the blank is moving in a direction parallel to said remaining walls.

5. In a machine for making boxes of the character described, means for folding one set of opposite walls and adhesively uniting the base portions of said walls to corresponding portions of a main body panel, while the blank is moving in a direction parallel said walls, and means for folding the remaining set of opposite walls and adhesively uniting the base portions of said remaining walls to corresponding portions of main body panel, while the blank is moving in a direction parallel to said remaining walls and localized pressing means applied to the lapping areas of individual walls where secured adhesively to the main body panel.

6. In a machine for making boxes of the character described, means for folding one set of opposite walls and adhesively uniting the base portions of said walls to corresponding portions of main body panel, while the blank is moving in a direction parallel to said walls, and means for folding the remaining set of opposite walls and adhesively uniting the base portions of said remaining walls to corresponding portions of main body panel, while the blank is moving in a direction parallel to said remaining walls and localized pressing means applied to the lapping areas of individual walls where secured adhesively to the main body part with pressure concentrated within in the edges but not on the edges, to avoid splitting of said edges.

7. In a machine for making knocked-down boxes having extending flanges from blanks prepared with walls connected to main body panel by intermediate panels, and one pair of opposite walls having corner flaps articulated thereto and the other pair of opposite walls having triangular end portions defined by diagonal lines, means for moving said blanks singly in direction parallel to walls having triangular portions thereon, means for folding said triangular portions reversely to lie folded back upon the outer surface of walls of which they form a part, means for folding said walls inwardly to overlie main body panel, means for applying adhesive between connecting panels of said walls and corresponding portions of main body panel, and means to fold said corner flaps inwardly upon walls to which said flaps are articulated, means for moving the blanks with all folds retained in folded position parallel to said walls having corner flaps articulated thereto, and means for folding said walls inwardly, means for applying adhesive between said folded corner flaps and said reversely folded triangular portions, and means for applying adhesive between connecting panels of said walls and corresponding portions of main body panel.

8. In a machine for making boxes with the outer edges thereof defined by lines of fold projecting beyond the inner area, means in the course of motion to cause folding inwardly of two opposite walls and to secure adhesion between base portions of said walls and the corresponding portions of the main body panel, means to cause triangular end portions of said walls to lie folded back upon said walls with the inner surfaces of said portions facing upwardly, and means to fold corner flaps of remaining walls inwardly upon walls to which said corner flaps are articulated, and means in the course of further motion to secure adhesion between said folded corner flaps and respective upwardly facing surfaces of said triangular portions, and also to secure adhesion between base portions of said remaining walls and corresponding portions of main body panels.

9. In a machine for forming extension edge boxes in flat knocked-down form, means for feeding the required blanks in cut and scored condition, means for folding and adhesively securing the side panels of the moving blank at the extension edge zones, and means for applying pressure exclusively to said extension edge zones while the blank is moving.

10. A method of forming boxes of the character described consisting of selectively folding four panels along lines defining the outer area and four other panels along lines defining the corners of the inner area of the folded box while blank is in motion, the four panels defining the corners of the inner area of the box being articulated to the ends of panels constituting walls of the blank and the four panels defining the outer area being articulated to the main body of the box by intermediate panels.

11. A method of making boxes in flat or knocked-down form having extending edges, consisting in preparing blanks having crease lines in the side walls thereof, said crease lines being parallel to crease lines connecting said walls to the main body panel with parallel crease lines between the four panels which will form the walls of the box and main body panel, moving said blanks along singly parallel to one pair of opposite walls and while moving applying adhesive to localized areas adjacent said parallel crease lines, thereafter folding said opposite pair of walls on the inner pair of crease lines defining the outer edges of the main body panel and applying localized pressure substantially to areas defined by said parallel crease lines, thereafter changing the position of the blank in relation to its direction of travel causing the blank to move parallel to the remaining pair of opposite walls, and while moving, the blank repeating the same operation on the remaining pair of walls.

12. In a machine of the character described, means for moving a box blank having three panels on each side thereof extending laterally of its direction of motion, the lines of fold connecting intermediate panels defining the outer area of the box, lines of fold of the remaining panels defining the inner area of the box, means for applying adhesive adjacent lines of fold of said intermediate panels, means for folding said intermediate panels on said lines of fold defining the exterior area of the main body panel, and means for folding the remaining panels on said lines of fold defining the interior area thereof, and means for pressing folded opposite edge areas having adhesive therebetween.

13. In a machine of the character described, means for providing cut and creased blanks having walls articulated to the main body by intermediate panels, two opposite walls having corner flaps attached thereto, means for moving said blanks along in a direction of motion parallel to the first noted walls, means for applying adhesive between intermediate panels to which said walls are articulated and the main body panels and means thereafter to fold said walls inwardly, and means to apply pressure to secure said intermediate panels to corresponding portions of the main body panel, means for changing the position of the blank in relation to its direction of travel, and means thereafter to fold corner flaps back upon infolded walls to which said flaps are articulated, means for applying adhesive between intermediate panels of said remaining walls and corresponding portions of main body panels, and also between portions of said remaining walls and said infolded corner flaps, and means to fold inwardly said remaining walls and means to apply pressure to secure adhesion between the intermediate panels and corresponding portions of main body panel, and also between said walls and said corner flaps.

14. In a machine of the character described for making extension edge boxes, means for moving a blank along parallel to a pair of opposite walls, said walls being connected to a main body panel by intermediate panels, means for applying adhesive adjacent the lines of fold articulating said intermediate panels to said main body panel, means for folding said walls inwardly along said lines of fold and means for applying pressure selectively without bearing on said lines of fold to secure adhesion of said intermediate panels to the main body panel.

15. In a machine for making boxes in flat or knocked-down form means for moving along a blank having three panels on each side thereof extending transverse to the direction of motion, two pairs of opposite panels being articulated to walls of the blank, and the remaining pair of opposite panels being articulated to the main body panel, means for folding said last named pair of panels on lines defining an outer area of the blank, and means for folding the other two pairs of panels on lines defining the interior area of the blank.

16. In a machine of the character described for making boxes with extending edges, adapted to instant erection, means for making ten distinct folds while the blank is traveling in the direction of motion parallel to two opposite walls, four of said folds being along angular lines defined in said walls, and remaining folds being parallel to the direction of motion, four of said folds being at the corners, and the remaining two of said folds being at the edges of the main body panel, the said lines of fold at the corners not being in alignment with said lines of fold at the edges of the main body panel.

17. In a machine of the character described for making boxes with extending edges, adapted to instant erection, means for making ten distinct folds while the blank is traveling in the direction of motion parallel to two opposite walls, four of said folds being along angular lines defined in said walls, and the remaining folds being parallel to the direction of motion, four of said folds being at the corners, and the remaining two of said folds being at the edges of the main body panel, the said lines of fold at the corners not being in alignment with said lines of fold at the edges of the main body panel, said angular folds serving to bring the outer surfaces of the blank into adjoining position, while said remaining folds serve to bring the inner surfaces of the blank into adjoining position.

18. In a machine of the character described, means for moving a blank having corner flaps extending from two opposite walls, and intermediate panels extending therebetween from the main body panel, means for folding said corner flaps inwardly on lines of fold not in alignment with lines of fold of said intermediate panels, and means for folding inwardly said intermediate panels and adhesively uniting base portions thereof to corresponding portions of main body panel.

19. A method of making boxes with extending edges which comprises providing cut and creased blanks, moving said blanks along and while in motion folding inwardly the side walls, adhesive having been applied adjacent the lines of fold to secure base portions of said side walls to corresponding portions of the main body panels, and also folding and adhesively securing reversely folded triangular end sections of one pair of opposite walls to corner flaps articulated to the other pair of opposite walls which are inwardly folded.

SAMUEL BERGSTEIN.